US012610058B2

(12) United States Patent
Ambrus et al.

(10) Patent No.: US 12,610,058 B2
(45) Date of Patent: Apr. 21, 2026

(54) LTR FRAME UPDATING IN VIDEO ENCODING

(71) Applicant: Axis AB, Lund (SE)

(72) Inventors: Michael Ambrus, Lund (SE); Viktor Edpalm, Lund (SE)

(73) Assignee: AXIS AB, Lund (SE)

( * ) Notice: Subject to any disclaimer, the term of this patent is extended or adjusted under 35 U.S.C. 154(b) by 26 days.

(21) Appl. No.: 18/654,390

(22) Filed: May 3, 2024

(65) Prior Publication Data

US 2024/0414352 A1 Dec. 12, 2024

(30) Foreign Application Priority Data

Jun. 12, 2023 (EP) ..................................... 23178738

(51) Int. Cl.
| | |
|---|---|
| *H04N 19/58* | (2014.01) |
| *H04N 19/105* | (2014.01) |
| *H04N 19/156* | (2014.01) |
| *H04N 19/172* | (2014.01) |
| *H04N 19/176* | (2014.01) |

(Continued)

(52) U.S. Cl.
CPC ......... *H04N 19/156* (2014.11); *H04N 19/105* (2014.11); *H04N 19/172* (2014.11); *H04N 19/176* (2014.11); *H04N 19/177* (2014.11); *H04N 19/127* (2014.11)

(58) Field of Classification Search
CPC .. H04N 19/156; H04N 19/105; H04N 19/172;
H04N 19/176; H04N 19/177; H04N
19/127; H04N 19/23; H04N 19/58; H04N
19/52; H04N 19/136; H04N 19/42; H04N
19/85
See application file for complete search history.

(56) References Cited

U.S. PATENT DOCUMENTS

| | | |
|---|---|---|
| 10,567,756 B2 | 2/2020 | Zhong et al. |
| 2012/0106632 A1 | 5/2012 | Zhang et al. |

(Continued)

FOREIGN PATENT DOCUMENTS

WO 2019227491 A1 12/2019

OTHER PUBLICATIONS

Xiaozhen Zheng, HEVC encoder solution for composite long-term reference picture, Oct. 6-12, 2018, Joint Collaborative Team on Video Coding (JCT-VC), Document: JCTVC-AG0028-v2 (Year: 2018).*

(Continued)

*Primary Examiner* — Hesham K Abouzahra
(74) *Attorney, Agent, or Firm* — Volpe Koenig

(57) ABSTRACT
Techniques for Long Term Reference (LTR) frame updating in a video encoding process are performed by an image processing device as part of the video encoding process. The method comprises encoding a first LTR frame. The method comprises encoding a plurality of frames referencing directly or indirectly to the first LTR frame. The method comprises sequentially updating the first LTR frame by evaluating a cost for encoding a block of image data in one of the plurality of frames and by updating an image area in the first LTR frame when the cost fulfils a cost criterion. The image area is updated based on the block of image data in at least one of the plurality of frames. The method comprises encoding the sequentially updated first LTR frame as a second LTR frame.

11 Claims, 5 Drawing Sheets

(51) Int. Cl.
 *H04N 19/177* (2014.01)
 *H04N 19/127* (2014.01)

(56) References Cited

U.S. PATENT DOCUMENTS

| | | |
|---|---|---|
| 2013/0266079 A1 | 10/2013 | Huang et al. |
| 2018/0007378 A1 | 1/2018 | Terada et al. |
| 2021/0360229 A1 | 11/2021 | Furht et al. |
| 2022/0150515 A1 | 5/2022 | Adzic et al. |

OTHER PUBLICATIONS

Fu, T., et al., "Composite Long-Term Reference Coding for Versatile Video Ciding(VVC)", IEEE International Conference on Image Processing (ICIP), Taipei, Taiwan, (2019).
Zheng, "Composite Long-Term Reference Coding for Versatile Video Coding(VVC)," Conference: 2019 IEEE International Conference on Image Processing (ICIP) (2019).

* cited by examiner

500a

500b

500c

500d

LTR FRAME UPDATING IN VIDEO ENCODING

TECHNICAL FIELD

Embodiments presented herein relate to a method, an image processing device, a computer program, and a computer program product for long-term reference frame updating in a video encoding process.

BACKGROUND

In general terms, to improve video encoding capability, one challenge is to increase compression efficiency while preserving the original video quality. Motion compensation prediction can be used as part to reach this goal. Motion compensation prediction generally involves applying a prediction model to generate a new frame by shifting macro-blocks or sub-blocks from the other frames. These frames are called reference frames. In this respect, both short-term (STR) frames and long-term reference frames (LTR) can be defined. An LTR frame is a frame marked as a reference for future frames, even for a long temporal distance. LTR frames can be saved and referenced until explicitly removed by the application.

In FIG. 1 are illustrated two examples of how LTR frames can be used. Starting with the first example as illustrated by a first sequence frames 100a in FIG. 1A, reference is made to an LTR frame from a set of P frames (where P is short for predictive). In some examples, the LTR frame and the P frames constitute one group of pictures (GOP). Continuing with the second example as illustrated by a second sequence frames 100b in FIG. 1B, reference is made to an LTR frame from two sets of P frames, where the P frames in each set also make reference to a respective I frame, and where each of the I frames also makes reference to the LTR frame (where I is short for intra). In some examples, the LTR frame, the I frames and the P frames constitute one GOP. In other examples, each I frame and its referencing P frames constitute one GOP, implying that there are two GOPs in the example in FIG. 1B.

Reference frames encoded with higher quality could improve image quality for the follow-up frames. If the video scenario has a stable image scene, the reference frames could be kept longer while decoding more frames, which will help avoid transferring another reference frame in case of the stable scene and hence save the transfer bandwidth. LTR frame has the advantage of being controlled by the encoding process at the application level. This adds the flexibility to improve the encoding efficiency.

A decoded image designated as an LTR frame can be saved to a frame memory over a long time period. Accordingly, it is possible to provide a long-term reference to the decoded frame designated as an LTR frame in subsequent decoding iterations.

In some cases, an appropriate reference frame may not necessarily be included in the video to be encoded. In such cases, an appropriate reference image is difficult to refer to for inter prediction. Thus, coding efficiency may be reduced.

In US20180007378 A1 is disclosed that an LTR frame can be updated in part based on a plurality of captured images. A moving object in a captured image can be recognized and only a background portion other than the area of the moving object is used for updating the LTR frame.

However, there is still a need for improved updating of LTR frames.

SUMMARY

An object of embodiments herein is to provide efficient updating of an LTR frame.

A particular object is to provide cost-efficient updating of an LTR frame.

A particular object is to avoid unnecessary updates of the LTR frame.

According to a first aspect there is presented a method for LTR frame updating in a video encoding process. The method is performed by an image processing device. The method, as part of the video encoding process, comprises encoding a first LTR frame. The method, as part of the video encoding process, comprises encoding a plurality of frames referencing directly or indirectly to the first LTR frame. The method, as part of the video encoding process, comprises sequentially updating the first LTR frame by evaluating a cost for encoding a block of image data in one of the plurality of frames and by updating an image area in the first LTR frame when the cost fulfils a cost criterion. The image area is updated based on the block of image data in at least one of the plurality of frames. The method, as part of the video encoding process, comprises encoding the sequentially updated first LTR frame as a second LTR frame.

According to a second aspect there is presented an image processing device for LTR frame updating in a video encoding process. The image processing device comprises processing circuitry. The processing circuitry is configured to cause the image processing device to, as part of the video encoding process, encode a first LTR frame. The processing circuitry is configured to cause the image processing device to, as part of the video encoding process, encode a plurality of frames referencing directly or indirectly to the first LTR frame. The processing circuitry is configured to cause the image processing device to, as part of the video encoding process, sequentially update the first LTR frame by evaluating a cost for encoding a block of image data in one of the plurality of frames, and by updating an image area in the first LTR frame when the cost fulfils a cost criterion. The image area is updated based on the block of image data in at least one of the plurality of frames. The processing circuitry is configured to cause the image processing device to, as part of the video encoding process, encode the sequentially updated first LTR frame as a second LTR frame.

According to a third aspect there is presented a computer program for LTR frame updating in a video encoding process. The computer program comprises computer code which, when run on processing circuitry of an image processing device, causes the image processing device to perform actions. One action comprises the image processing device to, as part of the video encoding process, encode a first LTR frame. The processing circuitry is configured to cause the image processing device to, as part of the video encoding process, encode a plurality of frames referencing directly or indirectly to the first LTR frame. One action comprises the image processing device to, as part of the video encoding process, sequentially update the first LTR frame by evaluating a cost for encoding a block of image data in one of the plurality of frames, and by updating an image area in the first LTR frame when the cost fulfils a cost criterion. The image area is updated based on the block of image data in at least one of the plurality of frames. One action comprises the image processing device to, as part of the video encoding process, encode the sequentially updated first LTR frame as a second LTR frame.

According to a fourth aspect there is presented a computer program product comprising a computer program according to the third aspect and a computer readable storage medium on which the computer program is stored. The computer readable storage medium could be a non-transitory computer readable storage medium.

Advantageously, these aspects provide efficient updates of the LTR frame.

Advantageously, these aspects provide cost-efficient updating of the LTR frame.

Advantageously, these aspects avoid unnecessary updates of the LTR frame.

Advantageously, these aspects allow only blocks of image data, and not the whole LTR frame to be updated at once. In turn, this improves the memory efficiency since less image data need to be processed for the update.

Advantageously, these aspects therefore reduce the need of data needed to be stored in memory for updating the LTR frame.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figures 1A, 1B, 2:
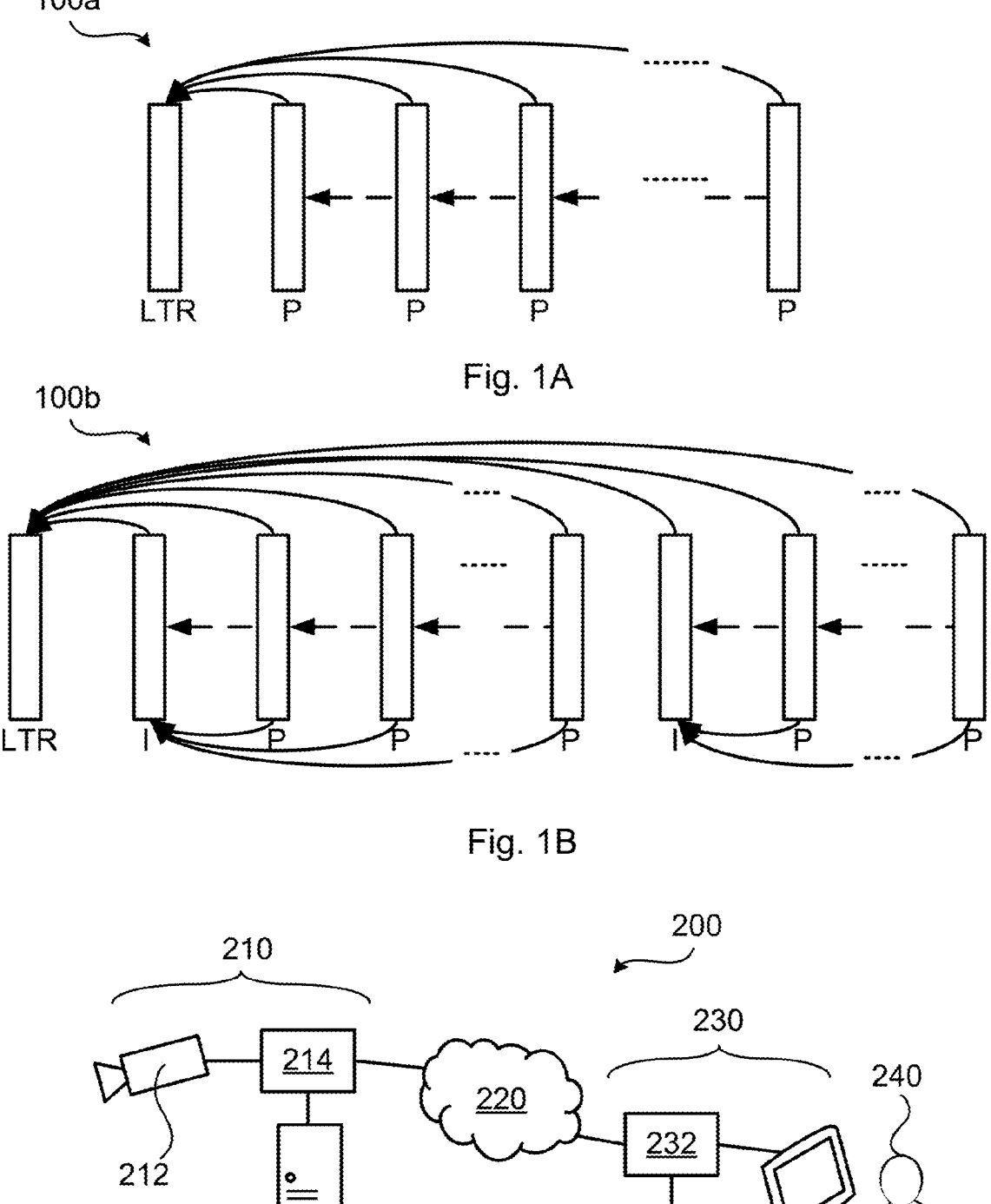
FIGS. 1A and 1B schematically illustrate sequences of frames according to embodiments.
FIG. 2 is a schematic diagram illustrating a system according to embodiments.

FIG. 2 is a schematic diagram illustrating a system 200 where embodiments presented herein can be applied. The system 200 comprises a first image processing device 210 and a second image processing device 230 that are operatively connected to each other by a network 220. The network 220 might be wired, wireless, or partly wired and partly wireless.

Aspects of the first image processing device 210 will be disclosed next. The first image processing device 210 comprises a camera device 212. The camera device 212 is configured to capture image frames. In some examples the camera device 212 is a digital camera device and/or capable of pan, tilt and zoom (PTZ) and can thus be regarded as a (digital) PTZ camera device. Further, the first image processing device 210 is configured to encode the images such that it can be decoded using any known video coding standard, such as any of: High Efficiency Video Coding (HEVC), also known as H.265 and MPEG-H Part 2; Advanced Video Coding (AVC), also known as H.264 and MPEG-4 Part 20; Versatile Video Coding (VVC), also known as H.266, MPEG-I Part 3 and Future Video Coding (FVC); VP9, VP10 and AOMedia Video 2 (AV1), just to give some examples. In this respect, the encoding might be performed either directly in conjunction with the camera device 212 capturing the image frames or at another entity, such as in a dedicated image encoder 216, and then, at least temporarily, stored in a database. The camera device 212 and the image encoder 216 are operatively connected to the network 220 via a first interface entity 214. In some examples, the camera device 212, the image encoder 216, and the first interface entity 214 are provided in one and the same device.

Aspects of the second image processing device 230 will be disclosed next. The second image processing device 230 comprises an image decoder 234. The image decoder 234 is configured to decode video streams received from the first image processing device 210. The image decoder 234 is therefore operatively connected to the network 220 via a second interface entity 232. Further, the second image processing device 230 is, via the second interface entity 232, operatively connected to a user interface device 236 with which a user 240 can interact. In some examples the user interface device 240 is a display device, such as a computer monitor, or screen, or a television device. In other examples, the user interface device 240 is a handheld portable device, such as a laptop computer, a tablet computer, or a mobile phone (also referred to as user equipment). In some examples, the user interface device 240, the image decoder 234, and the second interface entity 232 are provided in one and the same device.

As noted above, there is still a need for improved updating of LTR frames.

In further detail, updating an LTR frame in a video encoding process based on a plurality of frames has relatively high processing demands. In the present disclosure is therefore presented techniques to logically divide a single LTR frame into a plurality of regions, where only those regions that need to be updated are actually updated, instead of updating the whole LTR frame. The update is made based on image data of corresponding regions in groups of frames from an acquired video sequence.

The embodiments disclosed herein therefore in particular to techniques for LTR frame updating in a video encoding process. In order to obtain such techniques, there is provided an image processing device 210, 600, a method performed by the image processing device 210, 600, a computer program product comprising code, for example in the form of a computer program, that when run on an image processing device 210, 600, causes the image processing device 210, 600 to perform the method.

Which image areas to update in the LTR frame is based on information about how much it currently costs to encode a corresponding block of image data in a frame that references directly or indirectly to the LTR frame.

Figure 3:
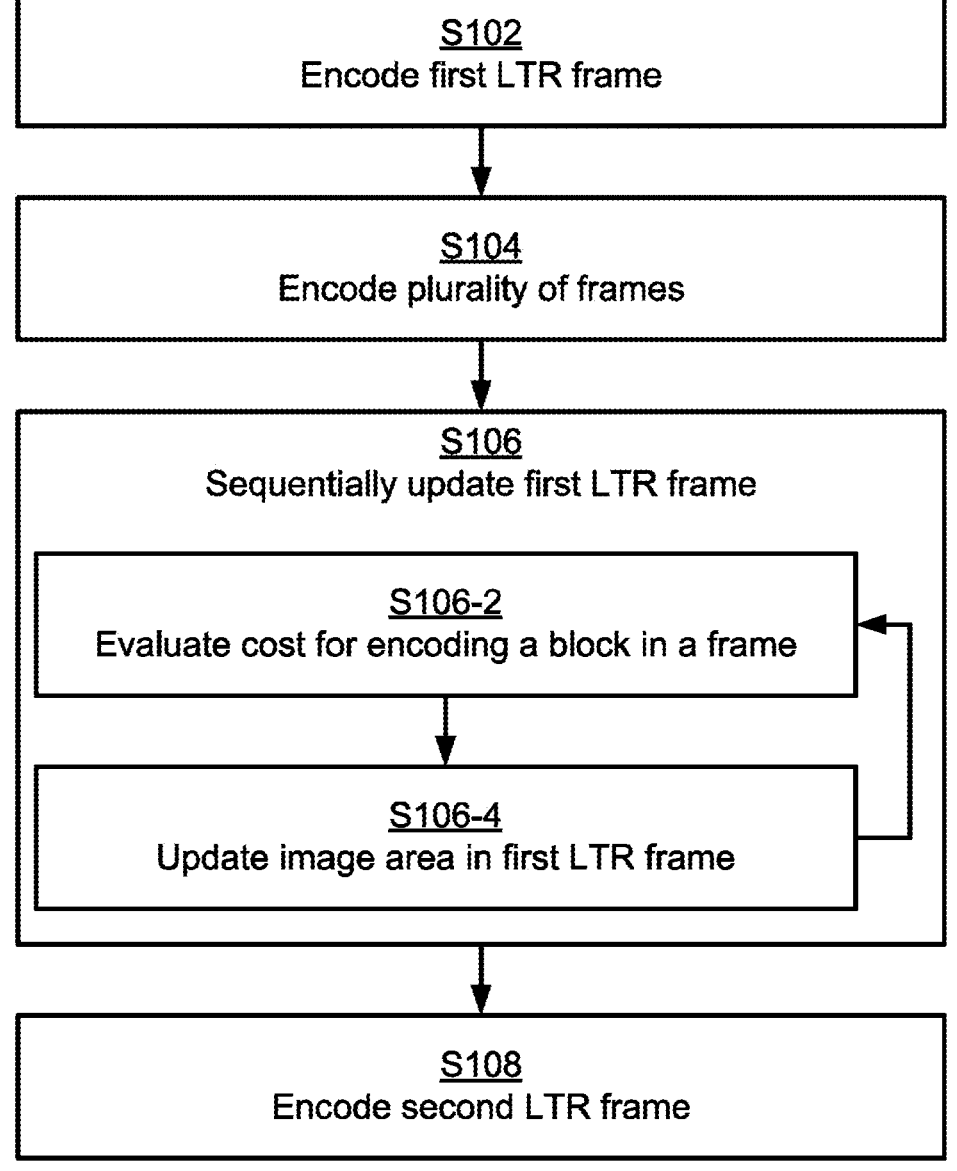
FIG. 3 is a flowchart of a method according to an embodiment.

FIG. 3 is a flowchart illustrating embodiments of a method for LTR frame updating in a video encoding process. The method is performed by the image processing device 210, 600. The method is advantageously provided as a computer program 720. The method as part of the video encoding process comprises steps S102-S108. Parallel reference is here also made to FIG. 4 which at reference 400 schematically illustrates a sequence of frames for updating of a first LTR frame (denoted LTR1) using image frames I1, I2, . . . , IK2 to yield an updated, second, LTR frame, denoted LTR2.

S102: The image processing device 210, 600 encodes a first LTR frame. The first LTR frame is denoted LTR1, as in FIG. 4. It here noted that the term "first" does not imply that the LTR frame is the first frame, or even the first LTR frame. The term "first" here is used to differentiate the LTR frame to a subsequent LTR frame, denoted second LTR frame. In some aspects, the second LTR frame can thus be regarded as a current LTR frame whereas the first LTR frame can be regarded as a previous LTR frame, and more precisely, the LTR frame occurring most recently before the second LTR frame. That is, the next time the LTR frame is to be updated (resulting in a third LTR frame), it is the second LTR frame that is used as the reference, and so on.

S104: The image processing device 210, 600 encodes a plurality of frames. These frames are denoted I1, I2, . . . , IK, and they reference directly or indirectly to the first LTR frame LTR1.

There could be different examples of such frames. In general terms, the frames are inter frames (and hence the notation "I1" and so on). The inter frames might be so-called P frames or B frames (where B is short for bi-directional).

The first LTR frame is sequentially updated to adapt to changing conditions in the scene so that the next LTR frame (i.e., the second LTR frame) that is actually encoded is useful, for example, for the encoding of a next GOP.

Figure 4:
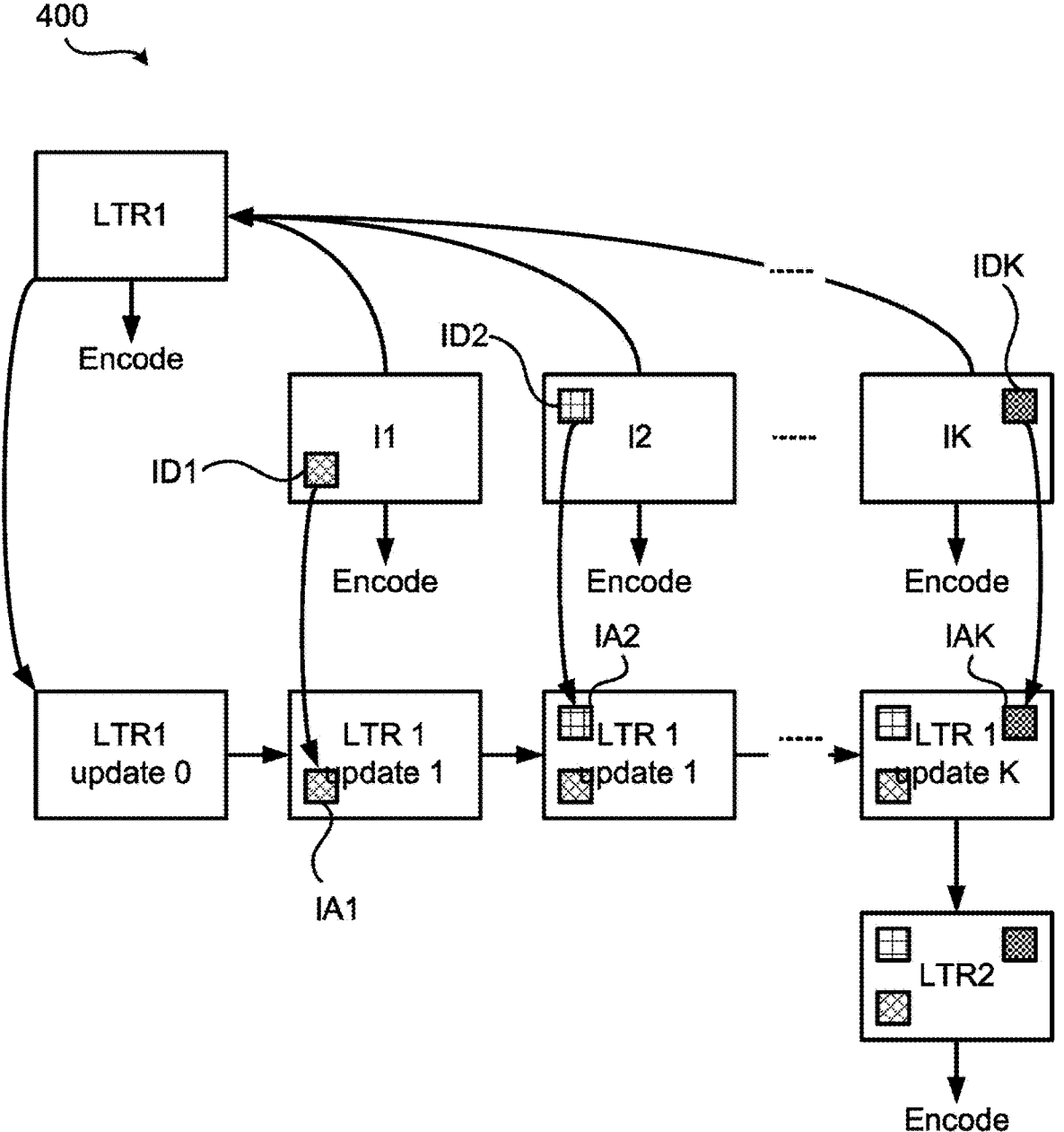
FIG. 4 schematically illustrates a sequence of frames used in a process of updating an LTR frame according to an embodiment.

S106: The image processing device 210, 600 sequentially updates the first LTR frame LTR1, resulting in intermediate LTR frames denoted LTR 1 update 1, LTR 1 update 2, . . . , LTR 1 update K. The updates are made to LTR1 update 0, which thus corresponds to the first LTR frame LTR1, but where LTR1 update 0 is not encoded, as illustrated in FIG. 4.

The first LTR frame LTR1 is sequentially updated according to steps S106-2 and S106-4. In this respect, steps S106-2 and S106-4 are thus performed repeatedly. These steps correspond to the process of updating parts of the first LTR frame but without encoding (or transmitting) the LTR frame after each update. In some examples, one run of steps S106-2 and S106-4 is performed for each of the K frames I1, I2, . . . , IK in the plurality of frames. Hence, in some examples, steps S106-2 and S106-4 are performed K times before step S108 is entered. However, in other examples, not all K frames I1, I2, . . . , IK are considered and thus steps S106-2 and S106-4 are performed less than K times before step S108 is entered.

S106-2: The image processing device 210, 600 evaluates a cost for encoding a block of image data, denoted ID1, ID2, . . . , IDK, in one of the plurality of frames I1, I2, . . . , IK. That is, the block of data ID1 belongs to image frame I1, and so on. However, the herein disclosed embodiments do not exclude the possibility of evaluating for encoding more than one block of data per frame.

In some examples, each block of image data ID1, ID2, . . . , IDK corresponds to one or more macroblocks.

S106-4: The image processing device 210, 600 updates an image area, denoted IA1, IA2, . . . , IAK in the first LTR frame LTR1 when the cost fulfils a cost criterion. The image area IA1, IA2, . . . , IAK is updated based on the block of image data ID1, ID2, . . . , IDK in at least one of the plurality of frames I1, I2, . . . , IK. That is, the image area IA1 is updated based on the block of image data ID1, and so on. As above, the herein disclosed embodiments do not exclude the possibility of updating more than one image area based on different blocks of data from one and the same frame I1, I2, . . . , IK.

In general terms, an update to a more accurate and up-to-date appearance in the image area may increase the usability of the image area such that it is referenced to in the encoding to a higher extent, thereby decreasing the encoding cost. Sequentially updating the first LTR frame LTR1 yields an updated first LTR frame denoted LTR 1 update K. Blocks of image data that do not fulfil the cost criterion are reused from the previous LTR frame, i.e., from the first LTR frame LTR1.

S108: The image processing device 210, 600 encodes the sequentially updated first LTR frame, denoted LTR 1 update K, as a second LTR frame. This second LTR frame that thus corresponds to LTR 1 update K is also denoted LTR2, and where LTR2 thus is encoded, as illustrated in FIG. 4.

There are benefits by the method both on the encoder side and the decoder side. On the encoder side, memory and processing efficiency is increased since less data needs to be processed at once. On the decoder side, where a relevant LTR frame is kept for the decoding, there may be a benefit in that only parts of the LTR frame, not the whole LTR frame, need to be updated every GOP. If information about only the block of image data to update is sent from the image encoder 216 to the image decoder 234, this benefit on the decoder side may be achieved. Further, one benefit for the decoder side is that a better LTR frame is produced faster, leading to lower bitrate and hence (often) a higher decode performance. If the LTR frame is updated too slowly, then slow scene changes might eliminate much of the LTR gains. As an illustrative example, with reference to a scene depicting a parking lot, according to the herein disclosed embodiments, a vehicle that during a day is parked on the parking lot could quickly be integrated into the LTR frame, whilst for a default algorithm, it might take the full day for the vehicle to be included, possibly not until the vehicle has eventually left the parking lot.

Embodiments relating to further details of LTR frame updating in a video encoding process as performed by the image processing device 210, 600 will now be disclosed.

There may be different examples of cost criteria. Different embodiments relating thereto will now be described in turn.

In some aspects, the cost criterion considers costs as evaluated for several image frames. That is, in some embodiments, the cost criterion pertains to the costs as evaluated for at least two of the plurality of frames I1, I2, . . . , IK. In this way, the trend of the cost for, for example, encoding a block of image data ID1, ID2, . . . , IDK, can be evaluated. In this way, a block of image data ID1, ID2, . . . , IDK for which the cost is increasing can be prioritized.

In particular, in some aspects, the cost criterion is fulfilled when the cost increases, or decreases, at certain pace or amount. In further detail, a block of image area that is encoded to a high extent using an LTR frame can typically be encoded to a low cost, whilst a block of image area that is encoded using intra blocks, instead of references to the LTR frame, to a high extent causes a high cost. By identifying areas in the LTR frame for which an encoding cost is increasing, a conclusion is that reference is made to the LTR frame to a lesser extent. Therefore, in some embodiments, the cost criterion is fulfilled when a pace at which the cost increases or decreases from one evaluation of the cost to a next, or over a range of adjacent evaluations of the cost, is bounded within a predetermined continuous range. In this respect, the pace is non-zero (i.e., either positive or negative). That is, in some embodiments, the predetermined continuous range is composed of points, and any point in the predetermined continuous range at least is distanced more than a predetermined distance to zero.

In some aspects, the cost criterion is not fulfilled if the cost is constantly high or constantly low (i.e., the amount is high or low and the pace is close to zero). In further detail, a block of image data for which an encoding cost is constantly high is, in some examples, not prioritized. These blocks of image data probably have changing and moving objects therein, for example depicting a busy pedestrian crossing, which make them difficult to encode with reference to an LTR frame. These blocks of image data of the LTR frames do not need to be useful or up-to-date since they are not referenced to. Also, an update would probably not be made based on an image background part, or static image part, since the pixels change much. An update would thus not only be unnecessary but also deteriorate the LTR frame. Therefore, in some embodiments, the cost criterion fails to be fulfilled when an amount of the cost is either above a first threshold value or below a second threshold value, where the second threshold value is lower than the first threshold value, and a pace at which the cost increases or decreases from one evaluation of the cost to a next evaluation of the cost, or over a range of adjacent evaluations evaluation of the cost, is within a predetermined distance to zero. That is, in some aspects, the cost criterion is not fulfilled if the cost for encoding is constantly high. In other words, in some embodiments, the cost criterion fails to be fulfilled when the costs over a range of adjacent evaluations of the cost are all above the first threshold value.

In some aspects, the cost criterion is not fulfilled if the cost is flickering between a high level and a low level. That is, in some embodiments, the cost criterion fails to be fulfilled when a pace at which the cost increases or decreases from one evaluation of the cost to a next evaluation of the cost, or over a range of adjacent evaluations of the cost, flickers between a first value and a second value, where the first value and the second value are distanced from each other more than a predetermined distance. By the first value and the second value being distanced from each other more than a predetermined distance this ensures that a flickering behavior of the cost is captured.

There could be different ways in which the cost for encoding the block of image data ID1, ID2, . . . , IDK is calculated. Different embodiments relating thereto will now be described in turn. In general terms, by encoding cost of a block of image data ID1, ID2, . . . , IDK is meant how efficient this block of image data ID1, ID2, . . . , IDK can be encoded.

In some aspects, the cost for encoding the block of image data ID1, ID2, . . . , IDK is based on how much the LTR frame can be used. That is, in some embodiments, the cost for encoding the block of image data ID1, ID2, . . . , IDK pertains to how much of the first LTR frame LTR1 can be used to encode the block of image data ID1, ID2, . . . , IDK. Then, the higher the amount of the first LTR frame LTR1 that can be used to encode the block of image data ID1, ID2, . . . , IDK is, the lower the cost for encoding the block of image data ID1, ID2, . . . , IDK is.

In some aspects, the cost for encoding the block of image data ID1, ID2, . . . , IDK is based on a prioritization of the block of image data ID1, ID2, . . . , IDK. One example of prioritization relates to prioritizing neighboring regions for update. In particular, in some aspects, the cost for encoding the block of image data ID1, ID2, . . . , IDK is based on whether or not neighboring blocks of image data ID1, ID2, . . . , IDK have been recently updated. A block of image data ID1, ID2, . . . , IDK for which a neighboring block of image data ID1, ID2, . . . , IDK has been recently updated is prioritized. By selecting such a block of image data ID1, ID2, . . . , IDK, neighboring blocks of image data ID1, ID2, . . . , IDK will be updated close in time, thus decreasing the risk of a sharp change in appearance at the boundary between neighboring blocks of image data ID1, ID2, . . . , IDK. That is, in some embodiments, the cost for encoding the block of image data ID1, ID2, . . . , IDK pertains to whether or not the first LTR frame LTR1 has been updated with image data ID1, ID2, . . . , IDK corresponding to another block of image data ID1, ID2, . . . , IDK that neighbors the block of image data. Then, the more neighboring blocks of image data ID1, ID2, . . . , IDK having image data ID1, ID2, . . . , IDK that the first LTR frame LTR1 has been updated with, the higher the block of image data ID1, ID2, . . . , IDK is prioritized for encoding.

Aspects of how often the evaluation in step S106-2 and the updating in step S106-4 are to be performed next.

It is here noted that not every block of data in every frame I1, I2, . . . , IK needs to be evaluated. The blocks of data do not need to correspond to the coding block structure. The blocks of data can have any size and shape. Larger blocks of data would provide a higher effect per update and smaller blocks of data can have the benefit of finding better candidates for the update. For example, it would be evident that a block of data covering a part of a road requires an update if a car is parked in that part and the block of data is so small that it is covered by the car. In that case, the block of data could be identified as prioritized for update since the cost of encoding that block of data would clearly rise. For a larger block of data, the rise in cost would likely not be so clear since the block of data covers also parts beside the car.

In some aspects, the evaluation in step S106-2 and the updating in step S106-4 is performed per each individual frame. But the cost criterion could still be based on costs as evaluated for several frames. Hence, in some embodiments, the evaluating and the updating are sequentially performed per each of the plurality of frames I1, I2, . . . , IK. In some aspects, the evaluation and the updating are simultaneously performed for a set of the frames. Hence, in some embodiments, the evaluating and the updating are sequentially performed per each set of the plurality of frames I1, I2, . . . , IK using a sliding window that for each occurrence of the evaluating and the updating covers one respective set of the frames. The size of the sliding window might be dependent on the size of the GOP. In some illustrative examples, the sliding window covers at least two frames but is no longer than half the size of the GOP.

Further in this respect, there might be different relations between the LTR and one GOP. In some examples, there is one LTR frame per GOP. That is, in some embodiments, the first LTR frame LTR1 and the plurality of frames I1, I2, . . . , IK referencing directly or indirectly to the first LTR frame LTR1 constitutes a first GOP, and the second LTR frame LTR2 constitutes a beginning of a second GOP. However, in other examples, there are several GOPs per LTR frame.

Figure 5:
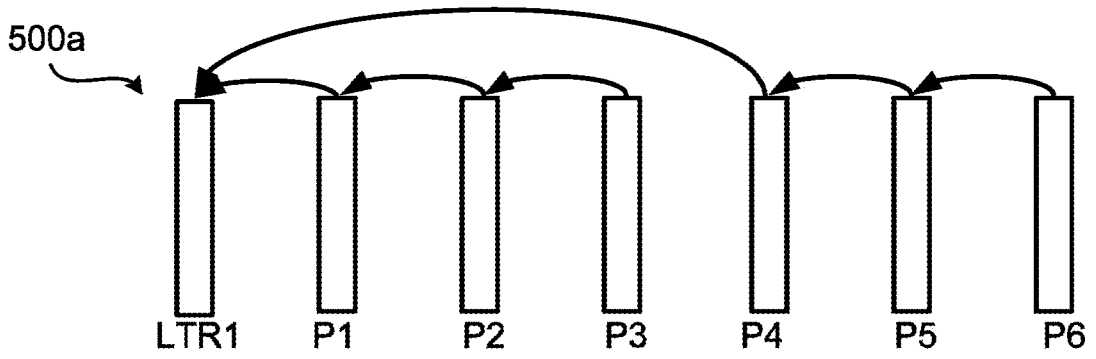
FIG. 5 schematically illustrates sequences of frames according to embodiments.
Figure 5:
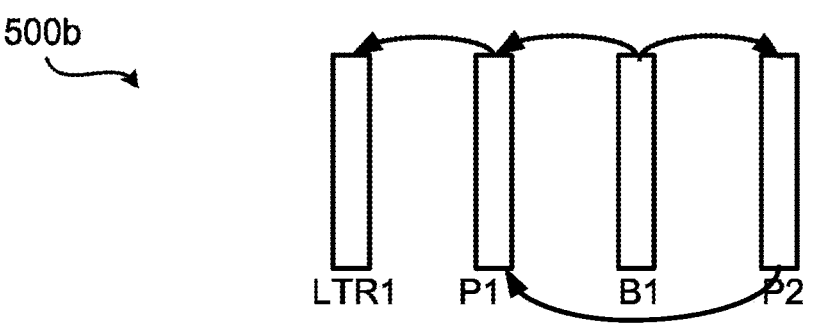
Figure 5:
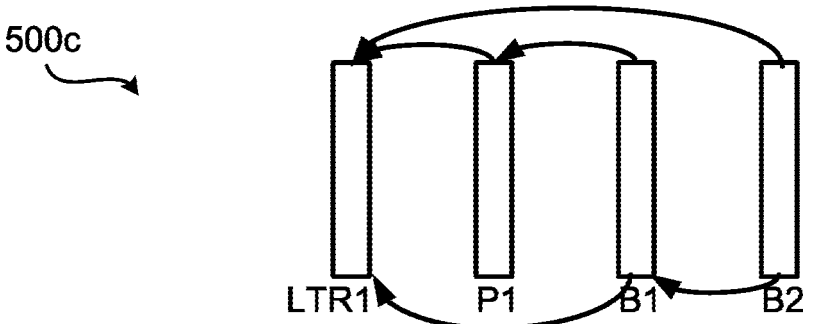
Figure 5:
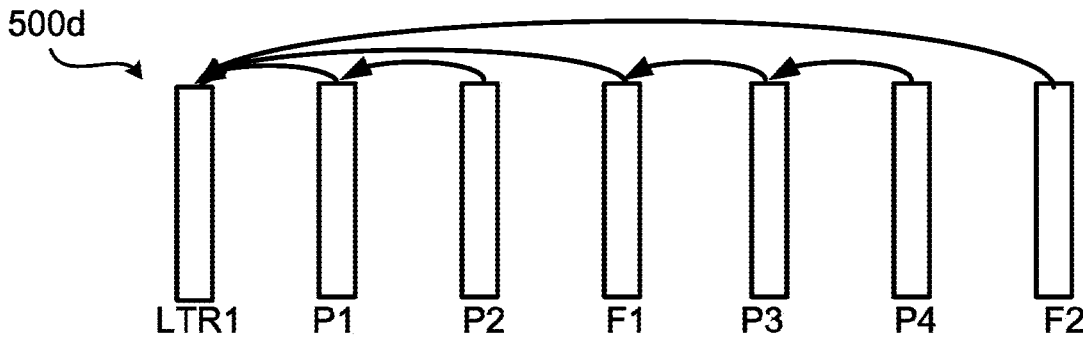

Reference is next made to FIG. 5 which schematically illustrates example sequences 500*a*, 500*b*, 500*c*, 500*d* of LTR frames, P frames, B frames and F frames according to embodiments. In this respect, the F frame can be regarded as a P frame that refers to an LTR frame. F frames thus provide shortcuts to an LTR frame. Also other P frames could make reference to an LTR frame.

During the encoding of the non-LTR frames of a GOP, the LTR frame is sequentially updated according to the inventive method to adapt to changing conditions in the scene so that the next LTR frame that is sent is useful for the encoding of the next GOP. Selected image areas of the LTR frame may be updated on the decoder side.

In at least some of these example sequences 500*a*: 500*d*, an LTR frame is an I frame with a tag denoting the frame as an LTR frame. The tag informs the image decoder 234 that the image decoder 234 should keep the frame until the next LTR frame is received, since the LTR frame will be used as a reference during the decoding. In contrast, a normal I frame, i.e., an I frame not tagged as an LTR frame, is kept only for decoding the next P or B frame.

According to sequence 500*a*, the P frames P1 and P4 make reference to the LTR frame (here called LTR 1) whereas the remaining P frames only make reference to its respective preceding P frame. A second LTR frame could follow after the last P frame (i.e., after P6) and be based on image data of LTR1 as well as image data of any, or all, of P1 to P6.

According to sequence 500*b*, the P frame P1 makes reference to the LTR frame (here called LTR1) whereas the P frame P2 only makes reference to P1 and the B frame B1 makes reference to both P1 and P2. A second LTR frame could follow after the last P frame (i.e., after P2) and be based on image data of LTR1 as well as image data of any, or all, of P1, P2, and B1.

According to sequence 500*c*, the P frame P1 as well as the B frames B1 and B2 make reference to the LTR frame (here called LTR1). In addition, B1 makes reference to P1 and B2 makes reference to B1. A second LTR frame could follow after the last B frame (i.e., after B2) and be based on image data of LTR1 as well as image data of any, or all, of P1, B1, and B2.

According to sequence 500*d*, the P frame P1 as well as the F frames F1 and F2 make reference to the LTR frame (here called LTR1) whereas the remaining P frames only make reference to its respective preceding frame (being either a P frame or an F frame). A second LTR frame could follow after the last F frame (i.e., after F2) and be based on image data of LTR1 as well as image data of any, or all, of F1, F2, P1, P2, P3, P4.

Figure 6:
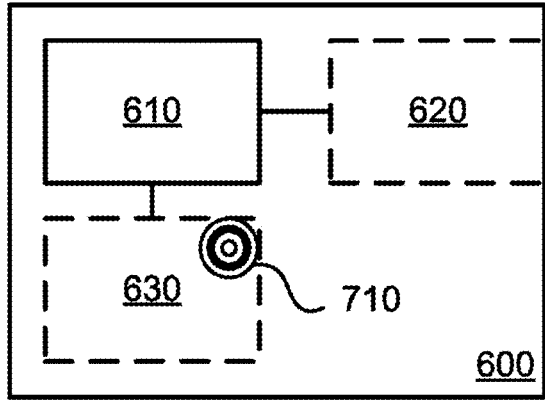
FIG. 6 is a schematic diagram showing functional units of an image processing device according to an embodiment.

FIG. 6 schematically illustrates, in terms of a number of functional units, the components of an image processing device 600 according to an embodiment. Processing circuitry 610 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 630. The processing circuitry 610 may further be provided as at least one application specific integrated circuit (ASIC), or field programmable gate array (FPGA).

Particularly, the processing circuitry 610 is configured to cause the image processing device 600 to perform a set of operations, or steps, as disclosed above. For example, the storage medium 630 may store the set of operations, and the processing circuitry 610 may be configured to retrieve the set of operations from the storage medium 630 to cause the image processing device 600 to perform the set of operations. The set of operations may be provided as a set of executable instructions.

Thus, the processing circuitry 610 is thereby arranged to execute methods as herein disclosed. The storage medium 630 may also comprise persistent storage, which, for example, can be any single one or combination of magnetic memory, optical memory, solid state memory or even remotely mounted memory. The image processing device 600 may further comprise a communications (comm.) interface 620 at least configured for communications with other entities, functions, nodes, and devices, as in FIG. 1. As such the communications interface 620 may comprise one or more transmitters and receivers, comprising analogue and digital components. The processing circuitry 610 controls the general operation of the image processing device 600 e.g., by sending data and control signals to the communications interface 620 and the storage medium 630, by receiving data and reports from the communications interface 620, and by retrieving data and instructions from the storage medium 630. Other components, as well as the related functionality, of the image processing device 600 are omitted in order not to obscure the concepts presented herein.

The image processing device 210, 600 may be provided as a standalone device or as a part of at least one further device. A first portion of the instructions performed by the image processing device 210, 600 may be executed in a first device, and a second portion of the of the instructions performed by the image processing device 210, 600 may be executed in a second device; the herein disclosed embodiments are not limited to any particular number of devices on which the instructions performed by the image processing device 210, 600 may be executed. Hence, the methods according to the herein disclosed embodiments are suitable to be performed by an image processing device 210, 600 residing in a cloud computational environment. Therefore, although a single processing circuitry 610 is illustrated in FIG. 6 the processing circuitry 610 may be distributed among a plurality of devices, or nodes. The same applies to the computer program 720 of FIG. 7.

Figure 7:
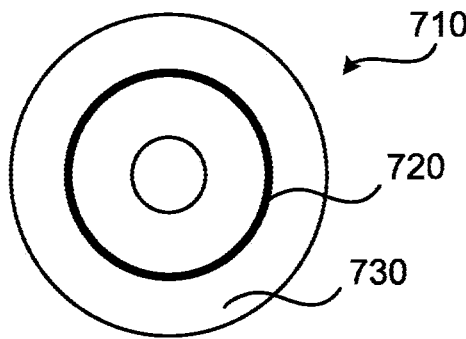
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 610 and thereto operatively coupled entities and devices, such as the communications interface 620 and the storage medium 630, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method performed by an image processing device for long-term reference (LTR) frame updating in a video encoding process, the method comprising:

encoding a first LTR frame;

encoding a plurality of frames referencing directly or indirectly to the first LTR frame;

sequentially updating the first LTR frame by:

evaluating a cost for encoding a block of image data in one of the plurality of frames; and updating an image area in the first LTR frame when the cost fulfils a cost criterion, wherein the image area is updated based on the block of image data in at least one of the plurality of frames; and encoding the sequentially updated first LTR frame as a second LTR frame;

wherein the cost criterion fails to be fulfilled when an amount of the cost is either above a first threshold value or below a second threshold value, where the second threshold value is lower than the first threshold value, and a pace at which the cost increases or decreases from one evaluation of the cost to a next evaluation of the cost, or over a range of adjacent evaluations evaluation of the cost, is within a predetermined distance to zero.

2. The method according to claim 1, wherein the cost criterion pertains to the costs as evaluated for at least two of the plurality of frames.

3. The method according to claim 1, wherein the cost criterion is fulfilled when a pace at which the cost increases or decreases from one evaluation of the cost to a next, or over a range of adjacent evaluations of the cost, is bounded within a predetermined continuous range.

4. The method according to claim 3, wherein the predetermined continuous range is composed of points, and wherein any point in the predetermined continuous range at least is distanced more than a predetermined distance to zero.

5. The method according to claim 1, wherein the cost criterion fails to be fulfilled when the costs over a range of adjacent evaluations of the cost are all above a first threshold value.

6. The method according to claim 1, wherein the cost for encoding the block of image data pertains to how much of the first LTR frame can be used to encode the block of image data, and wherein the higher the amount of the first LTR frame that can be used to encode the block of image data is, the lower the cost for encoding the block of image data is.

7. The method according to claim 1, wherein said evaluating and said updating are sequentially performed per each of the plurality of frames.

8. The method according to claim 1, wherein the first LTR frame and the plurality of frames referencing directly or indirectly to the first LTR frame constitutes a first group of pictures, GOP, and wherein the second LTR frame constitutes a beginning of a second GOP.

9. A method performed by an image processing device for long-term reference (LTR) frame updating in a video encoding process, the method comprising:

encoding a first LTR frame;

encoding a plurality of frames referencing directly or indirectly to the first LTR frame;

sequentially updating the first LTR frame by:

evaluating a cost for encoding a block of image data in one of the plurality of frames; and updating an image area in the first LTR frame when the cost fulfils a cost criterion, wherein the image area is updated based on the block of image data in at least one of the plurality of frames; and encoding the sequentially updated first LTR frame as a second LTR frame;

wherein the cost criterion fails to be fulfilled when a pace at which the cost increases or decreases from one evaluation of the cost to a next evaluation of the cost, or over a range of adjacent evaluations of the cost, flickers between a first value and a second value, where the first value and the second value are distanced from each other more than a predetermined distance.

10. A method performed by an image processing device for long-term reference (LTR) frame updating in a video encoding process, the method comprising:

encoding a first LTR frame;

encoding a plurality of frames referencing directly or indirectly to the first LTR frame;

sequentially updating the first LTR frame by:

evaluating a cost for encoding a block of image data in one of the plurality of frames;

and updating an image area in the first LTR frame when the cost fulfils a cost criterion, wherein the image area is updated based on the block of image data in at least one of the plurality of frames; and encoding the sequentially updated first LTR frame as a second LTR frame; wherein the cost for encoding the block of image data is based on a prioritization of the block of image data, and the cost for encoding the block of image data also pertains to whether or not the first LTR frame has been updated with image data corresponding to another block of image data that neighbors the block of image data, and wherein the more neighboring blocks of image data having image data that the first LTR frame has been updated with, the higher the block of image data is prioritized for encoding.

11. A method performed by an image processing device for long-term reference (LTR) frame updating in a video encoding process, the method comprising:

encoding a first LTR frame;

encoding a plurality of frames referencing directly or indirectly to the first LTR frame;

sequentially updating the first LTR frame by:

evaluating a cost for encoding a block of image data in one of the plurality of frames; and updating an image area in the first LTR frame when the cost fulfils a cost criterion, wherein the image area is updated based on the block of image data in at least one of the plurality of frames; and encoding the sequentially updated first LTR frame as a second LTR frame;

wherein said evaluating and said updating are sequentially performed per each set of the plurality of frames using a sliding window that for each occurrence of said evaluating and said updating covers one respective set of the frames.

\* \* \* \* \*